(12) United States Patent
Achiaz

(10) Patent No.: US 9,994,146 B2
(45) Date of Patent: Jun. 12, 2018

(54) BLIND SPOT INDICATOR

(71) Applicant: Itai Achiaz, Herzelya (IL)

(72) Inventor: Itai Achiaz, Herzelya (IL)

(*) Notice: Subject to any disclaimer, the term of this patent is extended or adjusted under 35 U.S.C. 154(b) by 232 days.

(21) Appl. No.: 15/009,164

(22) Filed: Jan. 28, 2016

(65) Prior Publication Data

US 2016/0214527 A1    Jul. 28, 2016

Related U.S. Application Data

(60) Provisional application No. 62/108,642, filed on Jan. 28, 2015.

(51) Int. Cl.
| *B60Q 1/00*  | (2006.01) |
| *B60Q 1/26*  | (2006.01) |
| *B60Q 1/50*  | (2006.01) |
| *B60R 1/12*  | (2006.01) |

(52) U.S. Cl.
CPC ......... *B60Q 1/2696* (2013.01); *B60Q 1/2607* (2013.01); *B60Q 1/2665* (2013.01); *B60Q 1/50* (2013.01); *B60R 1/1207* (2013.01); *B60Q 2400/50* (2013.01)

(58) Field of Classification Search
CPC ....................................................... G02B 1/00
See application file for complete search history.

(56) References Cited

U.S. PATENT DOCUMENTS

| 5,929,786 A     | 7/1999 | Schofield et al. |
| 6,193,380 B1    | 2/2001 | Jacobs |
| 6,744,353 B2    | 6/2004 | Sjonell |
| 7,049,945 B2    | 5/2006 | Breed et al. |
| 7,880,596 B2    | 2/2011 | Lynam et al. |
| 8,645,001 B2    | 2/2014 | Basson et al. |
| 2004/0114384 A1* | 6/2004 | Carter .................. B60Q 1/2665 362/494 |
| 2008/0040004 A1* | 2/2008 | Breed ................. B60R 21/0134 701/45 |
| 2013/0169425 A1 | 7/2013 | Victor et al. |
| 2015/0103543 A1* | 4/2015 | Pastrick ................ B60R 1/1207 362/465 |

* cited by examiner

*Primary Examiner* — Shirley Lu
(74) *Attorney, Agent, or Firm* — Myron Greenspan; Lackenbach Siegel LLP

(57) ABSTRACT

A beam is projected on the roadway by a vehicle that is visible to vehicles that are in its proximity, the beam on the roadway indicating to adjacent vehicles when they are in a blind spot of the beam generating vehicle. This makes it possible for the vehicle to slow down, speed up or move into another lane to avoid being in a blind spot of the vehicle in its proximity. An optical beam generator is mounted or integrated on a vehicle such as within side view mirror(s). The beam(s) may be generated using any suitable optical beam generator(s) including a laser, LED's or any other suitable source of illumination for projecting a line or other optical illuminated indicia to demarcate blind spot region(s) to operators of adjoining vehicles.

20 Claims, 2 Drawing Sheets

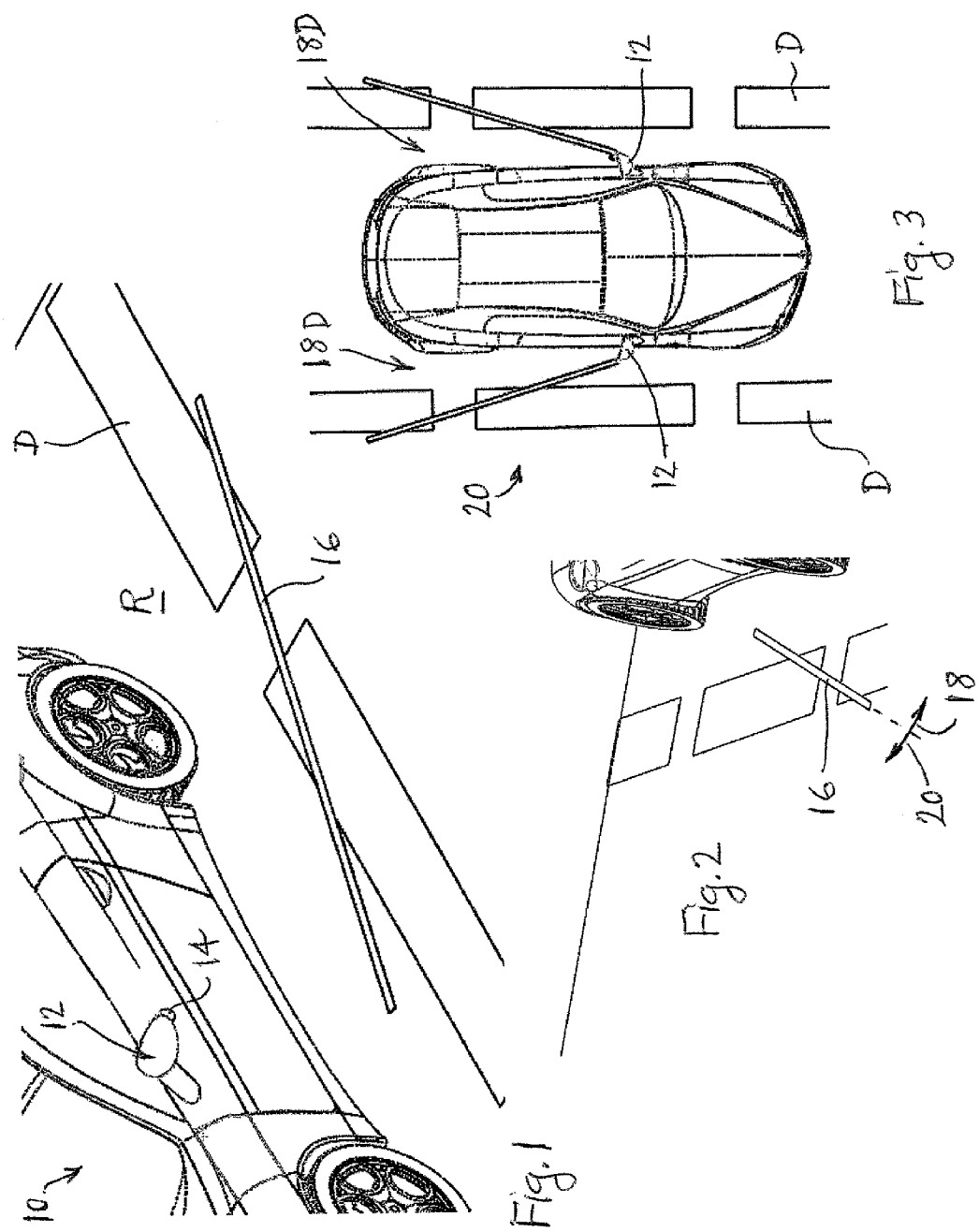

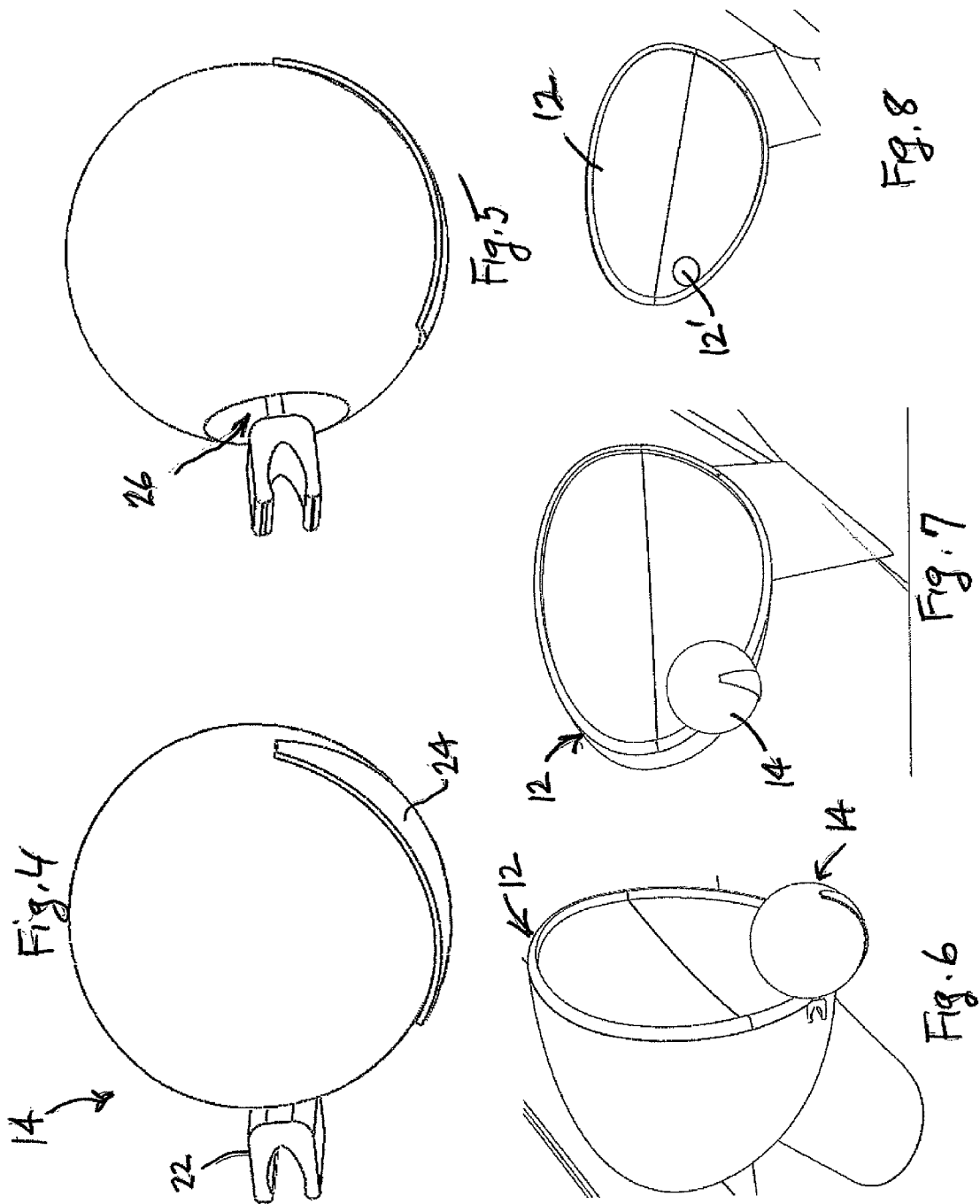

BLIND SPOT INDICATOR

BACKGROUND OF THE INVENTION

1. Field of the Invention

The present invention generally relates to warning devices for motor vehicles and, more specifically, to a blind spot indicator.

2. Description of the Background Art

The vehicle blind spot detection devices and systems have been known to enhance safety on the road. Thus, when a second vehicle is located in a position diagonally behind the driver's vehicle it can be difficult to perceive the second vehicle through the rear or side view mirrors even if the mirrors are correctly or properly aligned. It becomes even more difficult if the mirror is improperly aligned or has been moved by inadvertent actuation of the mirror positioning switches within the cabin or externally by a passerby. When the other vehicle is in the blind spot and, therefore, not visible to the driver, the driver may attempt to move the car into the path of the other vehicle and cause an accident with potential bodily injury or property damage.

Most of the prior art discloses blind spot detectors, some of which are quite elaborate and expensive, for alerting a driver that there is a vehicle in a blind spot that is not visible through the rear view mirrors. Examples of such prior art blind spot detectors are disclosed in the following patents: U.S. Pat. No. 5,929,786 issued Jul. 27, 1999; U.S. Pat. No. 6,193,380 issued Feb. 27, 2001; U.S. Pat. No. 6,744,353 issued Jun. 1, 2004; U.S. Pat. No. 7,049,945 issued May 23, 2006; U.S. Pat. No. 7,880,596 issued Feb. 1, 2011; U.S. Publication No. US 2013/0169425 published 7/4/13 and U.S. Pat. No. 8,645,001 issued Feb. 4, 2014.

While blind spot detector systems that detect and alert a driver that there is a vehicle in a blind spot, that is not visible in rear or side view mirrors, the other vehicle generally has no way of knowing if that vehicle is within the blind spot of an adjoining vehicle in close proximity. This frequently prevents the driver of the adjoining vehicle to be more alert and prepared to avoid any movements by the vehicle into his blind spot. Therefore, barring a vehicle having an elaborate blind spot detector system, the vehicle that is situated in a blind spot has little or no way of avoiding collisions due to inadvertent movements by the adjoining vehicle.

SUMMARY OF THE INVENTION

In order to achieve a solution to the blind spot problem, the present invention comprises a means for projecting a beam on the roadway that is visible to vehicles that are in its proximity, the beam on the roadway indicating when a vehicle is in a blind spot of another vehicle. This makes it possible for the vehicle to slow down, speed up or move into another lane to avoid being in a blind spot of the vehicle in its proximity. The means presently contemplated for providing such blind spot indicator is an optical beam mounted or integrated within side view mirrors that project a light beam on the roadway. The beam may be generated using any suitable optical projection means including a laser, LED's or any other suitable source of illumination for projecting a line or other optical illuminated indicia to demarcate the blind spot region or area of the vehicle projecting the beam.

BRIEF DESCRIPTION OF THE DRAWINGS

Those skilled in the art will appreciate the improvements and advantages that derive from the present invention upon reading the following detailed description, claims, and drawings, in which:

FIG. 1 is a perspective view of a portion of a vehicle on a roadway inside highway or roadway divider lines marked on the roadway and having a mirror provided with a blind spot indicator in accordance with the present invention;

FIG. 2 is similar to FIG. 1 but illustrating the view from a top rear perspective;

FIG. 3 is a top plan view of the vehicle shown between two divider lines or markings with blind spot indicators on both rear view mirrors;

FIGS. 4 and 5 are side elevational views of a blind spot indicator in accordance with the invention suitable for attachment to a rear view mirror on a vehicle;

FIG. 6 is a perspective view of a side view mirror onto which the blind spot indicator shown in FIGS. 4 and 5 has been attached;

FIG. 7 is similar to FIG. 6 illustrating the blind spot indicator from a different vantage point; and FIG. 8 is a front elevational view of a rear view mirror indicating one position on the smooth mirror surface on which a blind spot indicator may be attached by means of a suction cup or other suitable means.

DESCRIPTION OF PREFERRED EMBODIMENTS

Referring now more specifically to the Figures, in which the same or similar parts are designated by the same reference numerals throughout, and first referring to FIGS. 1 and 2, an automobile 10 has a rear view mirror 12, here shown on the driver's side of the vehicle. Attached to the rear view mirror 12 is a blind spot generator 14 in accordance with the invention for generating a beam 16 projected onto the roadway R. Divider lines or markings D are shown on the roadway R and the projected laser beam 16 extends from the location of the rear view mirror 12 rearwardly and outwardly to a point just inside an adjoining lane. The laser beam projected on the ground may be any suitable color, one preferably visible both during the daylight hours as well as night time hours. The beam 16 can also be changed to different colors to optimize its visibility both during daylight hours and night time hours. Thus, during daylight hours, the beam 16 may be darker in color, such as red, green, or the like. During night time hours, the beam 16 may be white or yellow as may be deemed best to enhance visibility. As best shown in FIGS. 2 and 3, the blind spot indicator beam 16 defines two regions. One side 18 of the beam 16, between the beam and the generating vehicle, is the region that is visible to the driver of the vehicle or automobile 10, while the side or region to the other side of the beam 16, namely the region indicated by the arrow 20 in FIG. 2, is that region that is not visible in the rear view mirror 12 and, therefore, results in a blind spot region not visible to the driver of the vehicle 10.

Referring to FIG. 3, each mirror 12 has blind spots 20, on the driver's side and on the passenger side. The projected beams 16 that define the blind spot regions on both sides of the vehicle 10, place drivers in both adjoining lanes on alert. The driver of the vehicle 10, therefore, is not alerted that there is a vehicle in a blind spot. However, the drivers situated in the blind spot regions are alerted that they are in a blind spot and they may want to take appropriate or suitable actions to avoid vehicle 10 and move away from its proximity in the event that the vehicle makes a turn to the right or to the left.

The specific construction of the blind spot indicator in accordance with the invention is not critical. Referring to FIGS. 4 and 5, for example, the blind spot generators 14 are provided with a holder 22 for attachment to the side view mirror in any suitable or appropriate way. The holder 22 may be joined to the blind spot indicator by means of an internal ball joint 26 (not visible) that allows the driver to make some adjustments in its orientation so that the beams are projected in an optimum way along the roadway.

The specific construction and the means for generating the beams is not critical as any visible beams projected onto the roadway to demarcate the visible region from the blind spot region can be used. A laser within the blind spot indicator 14 or a series of LED sources may be used. A beam emitter 24 may also be provided with a lens to focus the beam onto the roadway as a sharp line to optimize visibility.

Referring to FIGS. 6 and 7, the blind line spot indicator 14 is shown mounted on a rear view mirror 12. In FIG. 8, a smooth surface 12' on the rear view mirror 12 is shown to which another mounting mechanism may be used such as, for example, a suction cup or suction element that attaches the blind spot indicator directly onto the glass or mirror surface. While the blind spot generator 14 has been shown and described as being mounted on rear view mirrors it should be clear that these can be mounted anywhere on the vehicle, such as on the sides of the vehicle, as long as they are suitably adjusted to generate the defining beams (16).

It will be appreciated that the current invention provides a blind spot indicator to indicate and inform drivers in adjacent lanes whether they are or they are not in a blind spot region of an adjoining vehicle. If they are, they can slow down, speed up or move to another lane to move out of the blind spot region and, therefore, avoid a potential accident. The blind spot indicator of the present invention is simple, inexpensive and provides a solution to a problem that has existed for a long time.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A blind spot indicator for a moving vehicle having side view mirrors on each side of the vehicle creating a blind spot when the driver of the vehicle looks at each of the side view mirrors, comprising projecting means on the moving vehicle for projecting a beam of visible light on a roadway on which the moving vehicle is driving to indicate to proximate vehicles at least one blind spot region of the driver in the moving vehicle associated with at least one of the side view mirrors, said beam forming a sharp or distinct line on the roadway that has a predetermined thickness that is substantially smaller than a length of said line illuminated on the roadway defining boundaries of said at least one of said blind spot regions to the driver of a vehicle proximate to said at least one of said blind spot regions to whom the line on the roadway is visible; and switching means for selectively activating said projecting means.

2. A blind spot indicator as defined in claim 1, wherein projecting means is integrated into at least one exterior side view mirror on the monitored vehicle.

3. A blind spot indicator as defined in claim 2, wherein said projecting means is integrated into a side view mirror on the driver's side and on a side view mirror on the passenger side of the monitored vehicle to thereby project beams on both lateral sides of the monitored vehicle to define blind spot regions that can be detected by proximate vehicles on both sides of said monitored vehicle.

4. A blind spot indicator as defined in claim 1, wherein the blind spot indicator includes a housing and comprising connecting means for connecting or attaching said housing to at least one exterior side view mirror of the monitored vehicle.

5. A blind spot indicator as defined in claim 4, wherein said connecting means permanently connects said housing to said at least one exterior side view mirror.

6. A blind spot indicator as defined in claim 1, wherein said projecting means includes a laser for generating said beam.

7. A blind spot indicator as defined in claim 1, wherein said projecting means includes at least one LED for generating said beam.

8. A blind spot indicator as defined in claim 1, wherein said projecting means is arranged to project a rearward extending beam on the roadway from the location of a side view mirror at a predetermined angle in relation to a lengthwise direction of the monitored vehicle.

9. A blind spot indicator as defined in claim 8, wherein predetermined angle is selected to be within the range of 10°-35°.

10. A blind spot indicator as defined in claim 4, wherein said connecting means removably attaches said housing to said at least one exterior side view mirror.

11. A blind spot indicator as defined in claim 1, wherein said beam is projected in different colors to optimize visibility under different climatic or light conditions.

12. A blind spot indicator as defined in claim 1, wherein said switching means is coupled to an ignition switch for activating said projecting means when the ignition switch is turned on.

13. A blind spot indicator as defined in claim 1, wherein said switching means is coupled to a transmission shifter for activating said projecting means when the transmission shifter is moved to a drive position.

14. A blind spot indicator as defined in claim 1, wherein said switching means is a manual switch within the cabin of the monitored vehicle that can be manually switched by a driver of the monitored vehicle.

15. A blind spot indicator as defined in claim 1, wherein said projecting means includes a housing and adjusting means for adjusting at least one of the location and the orientation of said beam to optimize the projected blind spot indication for a predetermined monitored vehicle.

16. A blind spot indicator as defined in claim 1, wherein said connecting means comprises a suction element for attaching the blind spot indicator directly to a surface of a rear view mirror by means of suction or a vacuum.

17. A blind spot indicator as defined in claim 1, further comprising at least one optical element within the blind spot indicator to produce a more focused or sharper beam or line on the roadway to optimize visibility to drivers in proximate vehicles.

18. A blind spot indicator as defined in claim 17, wherein said at least one optical element comprises a beam splitter.

19. A blind spot indicator as defined in claim 17, wherein said at least one optical element comprises a lens.

20. A method of forming a blind spot indication for a moving vehicle having side view mirrors on each side of the vehicle creating a blind spot when the driver of the vehicle looks at each side view mirror, comprising projecting from the moving vehicle a beam of visible light on a roadway on which the moving vehicle is driving to indicate to proximate vehicles at least one blind spot region of the driver in the moving vehicle associated with at least one of the side view mirrors, said beam forming a sharp or distinct line on the roadway that has a predetermined thickness that is substantially smaller than a length of said line illuminated on the roadway defining boundaries of said at least one of said blind spot regions to a driver of a vehicle proximate to said at least one of said blind spot regions to whom the line on the roadway is visible; and selectively projecting the beam of visible light on the roadway by switching a projecting device on the moving vehicle.

* * * * *